(12) United States Patent
Wang

(10) Patent No.: US 9,859,792 B2
(45) Date of Patent: *Jan. 2, 2018

(54) SWITCHING-CAPACITOR REGULATOR WITH CHARGE INJECTION MODE FOR HIGH LOADING CURRENT

(71) Applicant: Silicon Motion Inc., Hsinchu County (TW)

(72) Inventor: Tsun-Hsin Wang, Yunlin County (TW)

(73) Assignee: Silicon Motion Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,178

(22) Filed: Feb. 10, 2017

(65) Prior Publication Data

US 2017/0155317 A1  Jun. 1, 2017

Related U.S. Application Data

(63) Continuation of application No. 14/205,386, filed on Mar. 12, 2014, now Pat. No. 9,614,433.

(30) Foreign Application Priority Data

Mar. 15, 2013  (TW) .............................. 102109331 A

(51) Int. Cl.
*H02M 3/07* (2006.01)
*H02M 1/00* (2006.01)
*G05F 1/565* (2006.01)

(52) U.S. Cl.
CPC ............... *H02M 3/07* (2013.01); *G05F 1/565* (2013.01); *H02M 3/073* (2013.01); *H02M 2001/0045* (2013.01); *H02M 2003/072* (2013.01)

(58) Field of Classification Search
CPC .. H02M 3/07; H02M 3/073; H02M 2003/072; H02H 3/24; H02H 3/243;
(Continued)

(56) References Cited

U.S. PATENT DOCUMENTS 5,726,870 A  3/1998 Lavieville
6,392,904 B1  5/2002 Bayer
(Continued)

FOREIGN PATENT DOCUMENTS

CN  1312493 A  9/2001
CN  101206491 A  6/2008
(Continued)

*Primary Examiner* — Jeffrey Gblende
*Assistant Examiner* — David A. Singh
(74) *Attorney, Agent, or Firm* — Winston Hsu

(57) ABSTRACT

A switching-capacitor regulator with a charge injection mode for a high loading current is used to generate an output voltage at an output node, where the switching-capacitor regulator includes a storage capacitor, a switch module, a current source and a control unit. The switch module is coupled between the storage capacitor, a first supply voltage, a second supply voltage and the output node. The current source is coupled to the output node, and is used for selectively providing a current to the output node. The control unit is coupled to the switch module and the output node, and is used for controlling the switch module to selectively charge or discharge the storage capacitor, and for controlling the current source to selectively provide the current to the output node, to adjust a voltage level of the output voltage

5 Claims, 3 Drawing Sheets

(58) Field of Classification Search
CPC ..... G05F 3/16; G05F 3/22; G05F 3/24; G05F 3/30; G05F 1/56; G05F 1/565; G05F 1/569; G05F 1/571; G05F 1/573; G05F 1/575
USPC ............ 323/276–277, 280–281; 363/59–60; 327/535–543; 361/78, 90, 82; 307/109–110
See application file for complete search history.

(56) References Cited

U.S. PATENT DOCUMENTS

| | | |
|---|---|---|
| 8,797,088 B2 | 8/2014 | Chan |
| 2002/0075705 A1 | 6/2002 | Bayer |
| 2004/0000896 A1 | 1/2004 | Barber, Jr. |
| 2004/0245972 A1 | 12/2004 | Vire |
| 2008/0191670 A1 | 8/2008 | Oddoart |
| 2009/0066408 A1 | 3/2009 | Fujiwara |
| 2011/0018618 A1 | 1/2011 | Shiu |
| 2012/0217947 A1 | 8/2012 | Micciche |
| 2013/0265103 A1 | 10/2013 | Hayashi |
| 2014/0070787 A1 | 3/2014 | Arno |

FOREIGN PATENT DOCUMENTS

| | | |
|---|---|---|
| CN | 101943716 A | 1/2011 |
| CN | 102761244 A | 10/2012 |
| CN | 104049663 B | 4/2017 |
| TW | 200737660 | 10/2007 |
| TW | 200933591 | 8/2009 |
| TW | 201202884 | 1/2012 |

SWITCHING-CAPACITOR REGULATOR WITH CHARGE INJECTION MODE FOR HIGH LOADING CURRENT

CROSS REFERENCE TO RELATED APPLICATIONS

This is a continuation of the co-pending U.S. application Ser. No. 14/205,386 (filed on Mar. 12, 2014). The entire content of the related applications is incorporated herein by reference.

BACKGROUND OF THE INVENTION

1. Field of the Invention

The present invention relates to a switching-capacitor regulator, and more particularly, to a switching-capacitor regulator that is able to provide a stable output voltage under over-loading current.

2. Description of the Prior Art

In a conventional switching-capacitor regulator, if a loading current exceeds a maximum current that a system can provide, an output voltage of the switching-capacitor regulator will have a great voltage drop, causing that the switching-capacitor regulator cannot provide a stable output voltage. In addition, due to the drop of the output voltage, an allowable value of the loading current is also decreased, causing unstable operations of elements of the system.

SUMMARY OF THE INVENTION

It is therefore an objective of the present invention to provide a switching-capacitor regulator that is able to provide a stable output voltage under over-loading current, to solve the above-mentioned problem.

According to one embodiment of the present invention, a switching-capacitor regulator with a charge injection mode for a high loading current is provided, where the switching-capacitor regulator is used to generate an output voltage at an output node, and the switching-capacitor regulator comprises a storage capacitor, a switch module, a current source and a control unit. The switch module is coupled between the storage capacitor, a first supply voltage, a second supply voltage and the output node. The current source is coupled to the output node, and is used for selectively providing a current to the output node. The control unit is coupled to the switch module and the output node, and is used for controlling the switch module to selectively charge or discharge the storage capacitor, and for controlling the current source to selectively provide the current to the output node, to adjust a voltage level of the output voltage.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
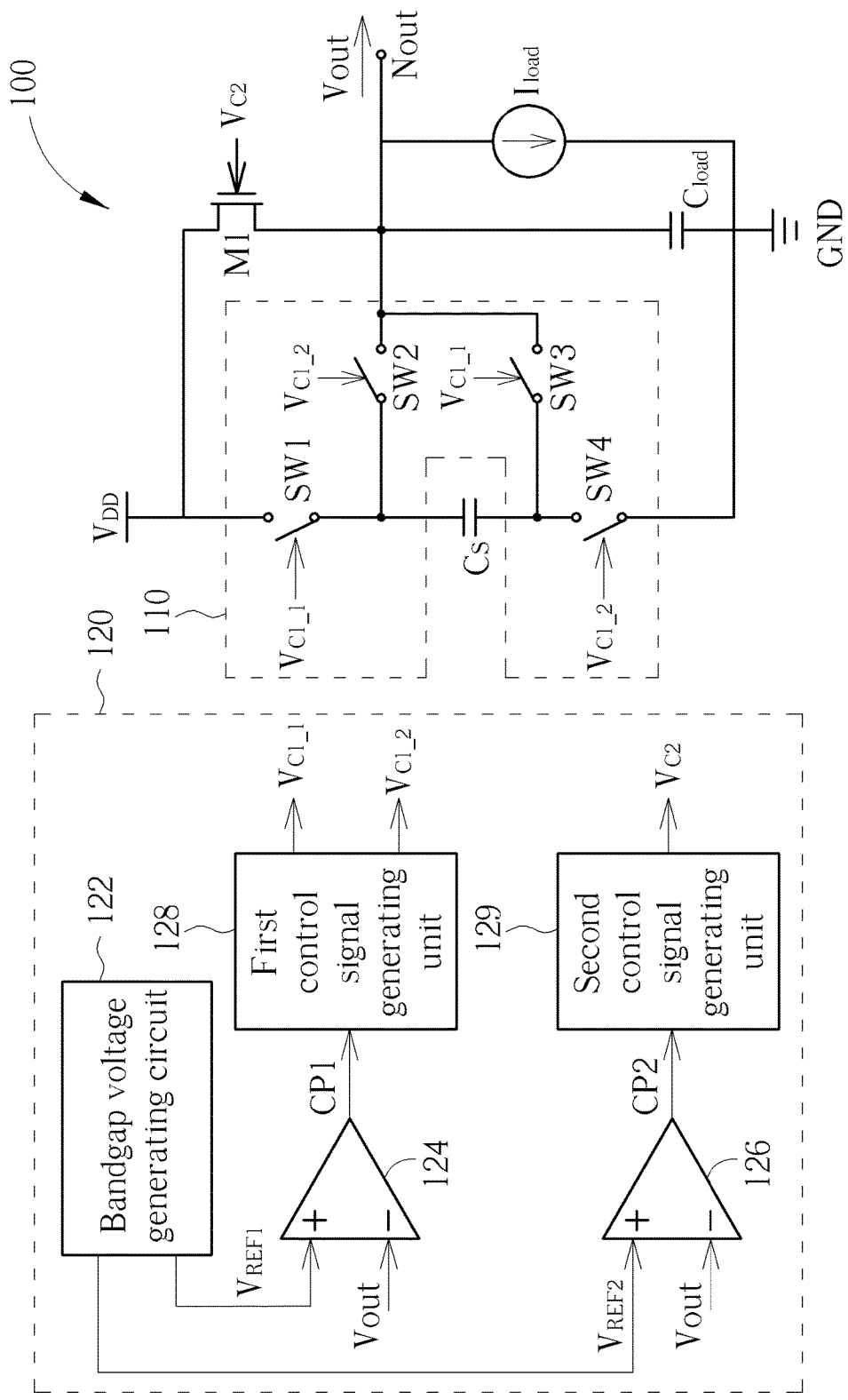
FIG. 1 is a diagram illustrating a switching-capacitor regulator according to one embodiment of the present invention.

Please refer to FIG. 1, which is a diagram illustrating a switching-capacitor regulator 100 according to one embodiment of the present invention, where the switching-capacitor regulator 100 is used to generate a stable output voltage Vout at an output node Nout, and the output node Nout is connected to a load (FIG. 1 shows a loading capacitor $C_{load}$ and a loading current $I_{load}$). As shown in FIG. 1, the switching-capacitor regulator 100 comprises a storage capacitor Cs, a switch module 110, a current source (in this embodiment, the current source is implemented by a transistor M1) and a control unit 120, where the switch module 110 comprises four switches SW1, SW2, SW3 and SW4, the switch SW1 is coupled to a supply voltage $V_{DD}$ and a first node of the storage capacitor Cs, and the switch SW1 is used to selectively connect the supply voltage $V_{DD}$ to the first node of the storage capacitor Cs; the switch SW2 is coupled between the first node of the storage capacitor Cs and the output node Nout, and the switch SW2 is used to selectively connect the first node of the storage capacitor Cs to the output node Nout; the switch SW3 is coupled between a second node of the storage capacitor Cs and the output node Nout, and the switch SW3 is used to selectively connect the second node of the storage capacitor Cs to the output node Nout; the switch SW4 is coupled to another supply voltage (in this embodiment, it is a ground voltage GND) and the second node of the storage capacitor Cs, and the switch SW4 is used to selectively connect the ground voltage GND to the second node of the storage capacitor Cs. In addition, the control unit 120 comprises a bandgap voltage generating circuit 122, a first comparator 124, a second comparator 126, a first control signal generating unit 128 and a second control signal generating unit 129, and the control unit 120 generates a plurality of first control signals $V_{c1\_1}$ and $V_{c1\_2}$ and a second control signal $V_{c2}$ to control the operations of the switch module 110 and the transistor M1, respectively.

In the operations of the switching-capacitor regulator 100, by enabling or disabling the switches SW1-SW4 to charge or discharge the storage capacitor Cs, and by enabling or disabling the transistor M1 to selectively charge the node Nout, the output voltage Vout can be kept at a stable level. In detail, the control unit 120 can enable or disable the switches SW1-SW4 to charge or discharge the storage capacitor Cs according to a level of the output voltage Vout, to maintain a stable output voltage Vout. However, when the loading current $I_{load}$ is too high to make the output voltage Vout be kept at a stable value, the control unit 120 will enable the transistor M1 to make the transistor serve as another current source to charge the output node Nout to increase the level of the output voltage Vout. The detailed operations of each element of the switching-capacitor regulator 100 are described as follows.

The bandgap voltage generating circuit 122 generates two reference voltages $V_{REF1}$ and $V_{REF2}$, where the reference voltage $V_{REF1}$ is an ideal value of the output voltage Vout, and the reference voltage $V_{REF2}$ is slightly lower than the reference $V_{REF1}$. For example, assuming that the supply voltage $V_{DD}$ is 3.3V and the reference voltage $V_{REF1}$ is 1.2V, the reference voltage $V_{REF2}$ can be 1.0V or 1.1V.

Then, the first comparator 124 compares the output voltage Vout and the reference voltage $V_{REF1}$ to generate a comparison result CP1, and the first control signal generating unit 128 generates the first control signals $V_{c1\_1}$ and $V_{c1\_2}$ to enable or disable the switches SW1-SW4 according to the comparison result CP1, where the first control signals $V_{c1\_1}$ and $V_{c1\_2}$ are out of phase (i.e., with opposite phases). In addition, the second comparator 126 compares the output voltage Vout and the reference voltage $V_{REF2}$ to generate a comparison result CP2, and the second control signal generating unit 129 generates the second control signal $V_{c2}$ to enable or disable the transistor M1 according to the comparison result CP2.

In detail, when the output voltage Vout is greater than the reference voltage $V_{REF1}$ the first control signal generating unit 128 generates the first control signals $V_{c1\_1}$ and $V_{c1\_2}$ to disable the switches SW1-SW4 to slowly discharge the output node Nout, to make the output voltage Vout be kept at a level of the reference voltage $V_{REF1}$. In addition, the second control signal generating unit 129 generates the second control signal $V_{C2}$ to disable the transistor M1.

Figure 2:
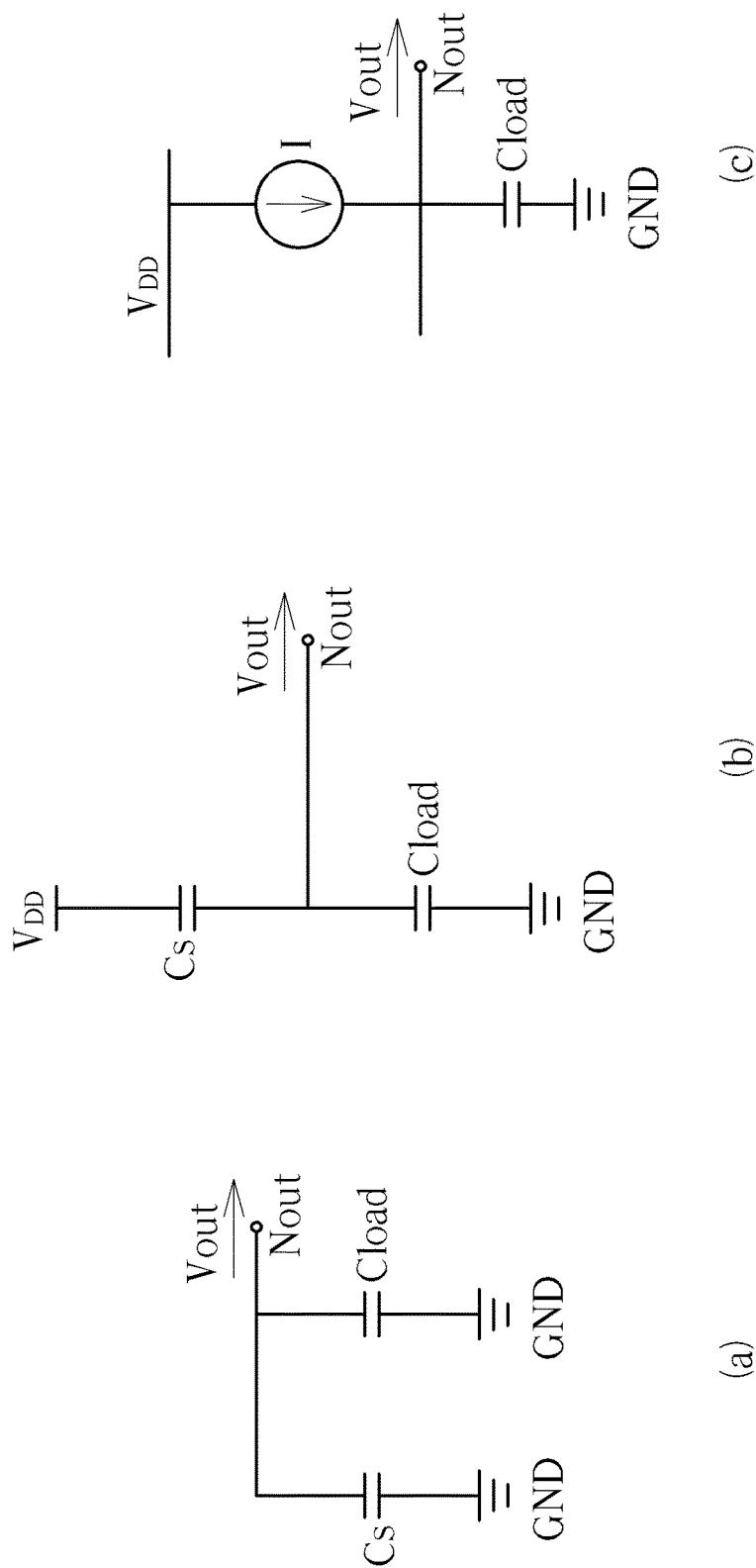
FIG. 2(a)-(c) are diagrams illustrating charging/discharging the storage capacitor and charging the output node when an output voltage of the switching-capacitor regulator is within different ranges.

When the output voltage Vout is lower than the reference voltage $V_{REF1}$, the first control signal generating unit 128 generates the first control signals $V_{c1\_1}$ and $V_{c1\_2}$, each of the first control signals has two phases periodically, to alternately charge and discharge the storage capacitor Cs to make the output voltage Vout be kept at the level of the reference voltage $V_{REF1}$. In detail, when it is to charge the storage capacitor Cs, the first control signal $V_{c1\_1}$ will enable the switches SW1 and SW3, and the first control signal $V_{c1\_2}$ will disable the switches SW2 and SW4, to charge the storage capacitor Cs and provide a current to the output node Nout, where FIG. 2 (b) shows the equivalent circuit when storage capacitor Cs is charged. In addition, when the it is to discharge the storage capacitor Cs, the first control signal $V_{c1\_2}$ will enable the switches SW2 and SW4, and the first control signal $V_{c1\_1}$ will disable the switches SW1 and SW3, to discharge the storage capacitor Cs, where FIG. 2 (a) shows the equivalent circuit when storage capacitor Cs is discharged. In addition, if the output voltage Vout is greater than the reference voltage $V_{REF2}$, the second control signal generating unit 129 will generate the second control signal $V_{c2}$ to disable the transistor M1.

In addition, when the output voltage Vout is lower than the reference voltage $V_{REF2}$, it is meant that the loading current $I_{load}$ is over high, causing that the output voltage Vout continues dropping and may not be kept at a stable value. At this time, the first control signal generating unit 128 continues to generate the first control signals $V_{c1\_1}$ and $V_{c1\_2}$ each has two phases periodically to make the storage capacitor Cs continues to charge the output node Nout, and the second control signal generating unit 129 generates the second control signal $V_{c2}$ to enable the transistor M1 to make the transistor M1 serve as a current source I to charge the output node Nout to increase the level of the output voltage Vout. FIG. 2(c) shows the equivalent circuit when the transistor M1 charges the output node Nout.

Figure 3:
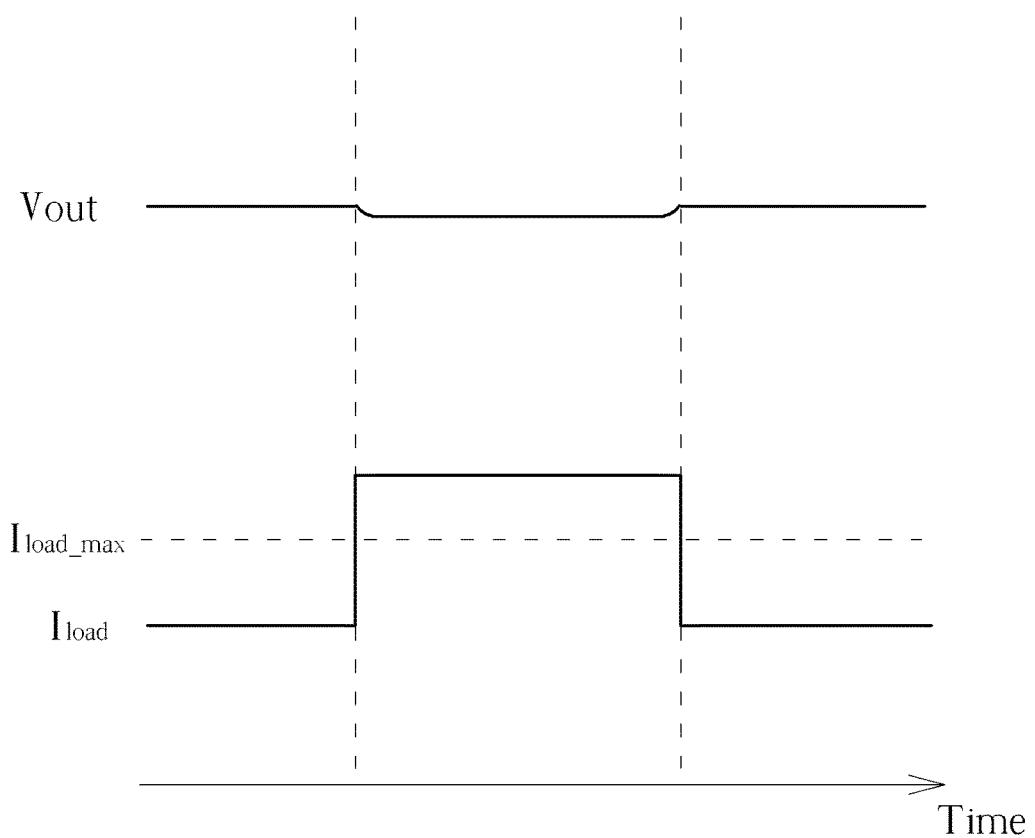
FIG. 3 shows a variation of the output voltage of the switching-capacitor regulator when the loading current exceeds a maximum loading current that a system can provide.

In light of above, because when the loading current $I_{load}$ is over-high, the transistor M1 will provide another charging path to charge the output node Nout to increase the level of the output voltage Vout, therefore, even the loading current $I_{load}$ exceeds a maximum loading current $I_{load\_max}$ provided by the system, the output voltage Vout is merely slightly decreased as shown in FIG. 3, and the operations of the system will not be influenced, where FIG. 3 shows a variation of the output voltage of the switching-capacitor regulator 100 when the loading current exceeds a maximum loading current that a system can provide.

In addition, the detailed circuit designs such as the switch module 120 comprising four switches SW1-SW4 and using the transistor M1 to implement the current source are for illustrative purposes only, and are not limitations of the present invention. In other embodiments of the present invention, because the switching-capacitor regulator has several different circuit structures, and the switch module 120 may be a combined circuit of a plurality of switches and several storage capacitors, as long as when the output voltage Vout of the switching-capacitor regulator is lower than the reference voltage VREF2, the output node Nout has an equivalent circuit shown in FIG. 2(c), the quantity of the switches of the switch module 120 and their coupling method can be designed by designer's consideration, and the transistor M1 can also be replaced by another current source. These alternative designs shall fall within the scope of the present invention.

Briefly summarized, in the switching-capacitor regulator of the present invention, when the output voltage of the switching-capacitor regulator is lower than a reference voltage due to an over-loading current, the switching-capacitor regulator can provide two current paths to charge the output node to make the output voltage be kept at a stable value. Therefore, the operations of the elements of the system will not be influenced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switching-capacitor regulator for generating an output voltage at an output node, comprising:
   a storage capacitor;
   a switch module, coupled between the storage capacitor, a first supply voltage, a second supply voltage and the output node, and the switch module comprises:
      a first switch, coupled to a first node of the storage capacitor, for selectively connecting the first supply voltage to the first node of the storage capacitor;
      a second switch, coupled between the first node of the storage capacitor and the output node, for selectively connecting the first node of the storage capacitor to the output node;
      a third switch, coupled between a second node of the storage capacitor and the output node, for selectively connecting the second node of the storage capacitor to the output node; and
      a fourth switch, coupled to the second node of the storage capacitor, for selectively connecting the second supply voltage to the second node of the storage capacitor;

a current source, connected to the output node, for selectively providing a current to the output node; and a control unit, coupled to the switch module and the output node, for referring to a voltage level of the output voltage to control the switch module to selectively charge or discharge the storage capacitor, and to control the current source to selectively provide the current to the output node, to adjust the output voltage;

wherein when the output voltage is greater than a first reference voltage, the control unit disables all of the first switch, the second switch, the third switch, the fourth switch and the current source; when the output voltage is lower than the first reference voltage and is greater than a second reference voltage, the control unit controls the first switch, the second switch, the third switch and the fourth switch to alternately charge and discharge the storage capacitor, and the control unit disables the current source; and when the output voltage is lower than the second reference voltage, the control unit controls the first switch, the second switch, the third switch and the fourth switch to alternately charge and discharge the storage capacitor, and the control unit enables the current source.

2. The switching-capacitor regulator of claim 1, wherein the control unit comprises:

a first comparator, for comparing the output voltage and the first reference voltage to generate a first comparison result;

a first control signal generating unit, coupled to the first comparator, for generating a plurality of first control signals to control the switch module according to the first comparison result;

a second comparator, for comparing the output voltage and the second reference voltage to generate a second comparison result; and a second control signal generating unit, coupled to the second comparator, for generating a second control signal to control the current source according to the second comparison result.

3. The switching-capacitor regulator of claim 1, wherein the current source is a switch coupled between the first supply voltage and the output node, and is utilized for selectively connecting the first supply voltage to the output node.

4. The switching-capacitor regulator of claim 3, wherein the current source is utilized for selectively connecting the first supply voltage directly to the output node, without through the switch module.

5. The switching-capacitor regulator of claim 1, wherein the first reference voltage and the second reference voltage are generated by a bandgap voltage generating circuit.

* * * * *